US009652828B1

(12) United States Patent
Sabripour et al.

(10) Patent No.: US 9,652,828 B1
(45) Date of Patent: May 16, 2017

(54) METHOD AND APPARATUS FOR IMAGING A SCENE (71) Applicant: MOTOROLA SOLUTIONS, INC., Schaumburg, IL (US)

(72) Inventors: Shervin Sabripour, Plantation, FL (US); Melanie A. King, Hollywood, FL (US); Patrick D. Koskan, Lake Worth, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/983,278

(22) Filed: Dec. 29, 2015

(51) Int. Cl.
*G06K 9/32* (2006.01)
*G06T 3/40* (2006.01)
*G06K 9/36* (2006.01)

(52) U.S. Cl.
CPC .......... *G06T 3/4038* (2013.01); *G06K 9/3233* (2013.01); *G06K 9/36* (2013.01)

(58) Field of Classification Search
CPC ... G06T 7/0024; G06T 7/0026; G06T 7/0028; G06T 7/0034; G06K 9/32
See application file for complete search history.

(56) References Cited

U.S. PATENT DOCUMENTS

| | | | | |
|---|---|---|---|---|
| 7,505,982 B2* | 3/2009 | Wang | ................... | G06F 3/03545 |
| 7,908,241 B2* | 3/2011 | Viikari | ................... | G06Q 10/10 |
| | | | | 707/602 |
| 8,194,993 B1* | 6/2012 | Chen | ................... | G06T 5/006 |
| | | | | 348/231.6 |
| 8,290,305 B2* | 10/2012 | Minear | ................... | G06T 7/0026 |
| | | | | 345/629 |
| 8,428,391 B2 | 4/2013 | Park | | |
| 8,504,640 B2 | 8/2013 | Rios et al. | | |
| 8,554,799 B2* | 10/2013 | Ott | ................... | G06Q 10/10 |
| | | | | 707/791 |
| 8,831,380 B2 | 9/2014 | Ofek et al. | | |
| 9,036,001 B2 | 5/2015 | Chuang et al. | | |
| 9,092,432 B2* | 7/2015 | Li | ................... | G06F 17/30017 |
| 9,094,615 B2 | 7/2015 | Aman et al. | | |

(Continued)

OTHER PUBLICATIONS

PCT/US2016/065154 International Search Report and Written Opinion of the International Searching Authority dated Mar. 6, 2017 (11 pages).

*Primary Examiner* — Amir Alavi
(74) *Attorney, Agent, or Firm* — Michael Best & Friedrich LLP (57) ABSTRACT

A method and apparatus for imaging a scene. The method includes receiving a plurality of images of the scene from a plurality of first source devices. The method also includes receiving a first metadata identifying a location and a field-of-view of each of the plurality of first source devices. The method also includes receiving a second metadata identifying a location and a field-of-view of each of one or more available image source devices. The method also includes identifying overlapping portions of the plurality of images. The method also includes stitching the plurality of images together to form a combined image of the scene based on the overlapping portions of the plurality of images. The method also includes identifying a missing portion of the combined image of the scene and responsive to identifying the missing portion, performing one or more actions to fill a part of the missing portion.

21 Claims, 7 Drawing Sheets

(56) References Cited

U.S. PATENT DOCUMENTS

| | | |
|---|---|---|
| 9,167,176 B2 * | 10/2015 | Winter .................. H04N 5/262 |
| 9,390,513 B2 * | 7/2016 | Jin ........................ G06T 7/0071 |
| 2009/0262206 A1 | 10/2009 | Park |
| 2010/0026809 A1 | 2/2010 | Curry |
| 2013/0010111 A1 | 1/2013 | Laforte et al. |
| 2013/0093896 A1 | 4/2013 | Jeon |
| 2014/0199041 A1 | 7/2014 | Blanco et al. |
| 2015/0092109 A1 | 4/2015 | Mo et al. |
| 2015/0138190 A1 | 5/2015 | Holzer et al. |
| 2015/0238073 A1 | 8/2015 | Charles et al. |

* cited by examiner

METHOD AND APPARATUS FOR IMAGING A SCENE

BACKGROUND OF THE INVENTION

Multiple and varied first responders (i.e., people designated and trained to respond to an emergency, including, but not limited to police officers, fire fighters, and medical personnel) may respond to the scene of an incident (i.e., an event or an occurrence, such as a fire, a traffic accident, and the like). One or more of the first responders may support an image source device (e.g., a body-worn camera). In some examples, vehicles used by one or more of the first responders may also support an image source device (e.g., a dashboard camera). In other examples, structures on the scene may support an image source device (e.g., a fixed security camera, a traffic camera, or other suitable fixed camera)

A control center may receive images (e.g., still images or video images) from the image source devices. Although the images may all provide a view of the scene of the incident, the images may have different points of view, different zoom levels, different aspect ratios, and the like, which may change (e.g., as a first responder or a vehicle supporting an image source device moves).

Accordingly, there is a need for improved methods and apparatuses for imaging a scene using images received from one or more image source devices located at the scene.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method for imaging a scene. The method includes receiving a plurality of images of the scene from a plurality of first source devices. The method also includes receiving a first metadata identifying a location and a field-of-view of each of the plurality of first source devices and receiving a second metadata identifying a location and a field-of-view of each of one or more available image source devices associated with the scene. The method also includes identifying overlapping portions of the plurality of images and stitching the plurality of images together to form a combined image of the scene based on the overlapping portions of the plurality of images. The method also includes identifying a missing portion of the combined image of the scene. In addition, the method includes, responsive to identifying the missing portion, performing one or more actions to fill a part of the missing portion. The one or more actions includes at least one selected from the group consisting of (i) instructing, as a function of the first metadata, one of the plurality of first source devices to modify a field-of-view, a location, or both to capture the part of the missing portion and subsequently receiving the part of the missing portion, (ii) requesting, as a function of the first metadata, historical image data of the part of the missing portion, and subsequently receiving the part of the missing portion, and (iii) requesting, as a function of the second metadata, one of the one or more available image source devices to activate imaging capability to capture the part of the missing portion, and subsequently receiving the part of the missing portion.

Another embodiment provides a controller for imaging a scene. The controller includes a memory and an electronic processor. The electronic processor is electrically coupled to the memory and is configured to receive a plurality of images of the scene from a plurality of first source devices. The electronic processor is also configured to receive a first metadata identifying a location and a field-of-view of each of the plurality of first source devices and receive a second metadata identifying a location and a field-of-view of each of one or more available imaging devices associated with the scene. The electronic processor is also configured to identify overlapping portions of the plurality of images and stitch the plurality of images together to form a combined image of the scene based on the overlapping portions of the plurality of images. In addition, the electronic processor is configured to identify a missing portion of the combined image of the scene. The electronic processor is also configured to, responsive to identifying the missing portion, perform one or more actions to fill a part of the missing portion. The one or more actions includes at least one selected from the group consisting of (i) instruct, as a function of the first metadata, one of the plurality of first source devices to modify a field-of-view, a location, or both to capture a part of the missing portion and subsequently receive the part of the missing portion, (ii) request, as a function of the first metadata, historical image data of the part of the missing portion, and subsequently receive the part of the missing portion, and (iii) request, as a function of the second metadata, one of the one or more available imaging devices to activate imaging capability to capture the part of the missing portion, and subsequently receive the part of the missing portion.

Yet another embodiment provides a non-transitory computer-readable medium comprising instructions that when executed are configured to cause an electronic processor to perform a set of functions. The set of functions includes receiving a plurality of images of a scene from a plurality of first source devices, receiving a first metadata identifying a location and a field-of-view of each of the plurality of first source devices, and receiving a second metadata identifying a location and a field-of-view of each of one or more available image source devices associated with the scene. The set of functions also includes identifying overlapping portions of the plurality of images and stitching the plurality of images together to form a combined image of the scene based on the overlapping portions of the plurality of images. In addition, the set of functions includes identifying a missing portion of the combined image of the scene. The set of functions also includes, responsive to identifying the missing portion, performing one or more actions to fill a part of the missing portion. The one or more actions includes at least one selected from the group consisting of (i) instructing, as a function of the first metadata, one of the plurality of first source devices to modify a field-of-view, a location, or both to capture the part of the missing portion and subsequently receiving the part of the missing portion, (ii) requesting, as a function of the first metadata, historical image data of the part of the missing portion, and subsequently receiving the part of the missing portion, and (iii) requesting, as a function of the second metadata, one of the one or more available image source devices to activate imaging capability to capture the part of the missing portion, and subsequently receiving the part of the missing portion.

Figure 1:
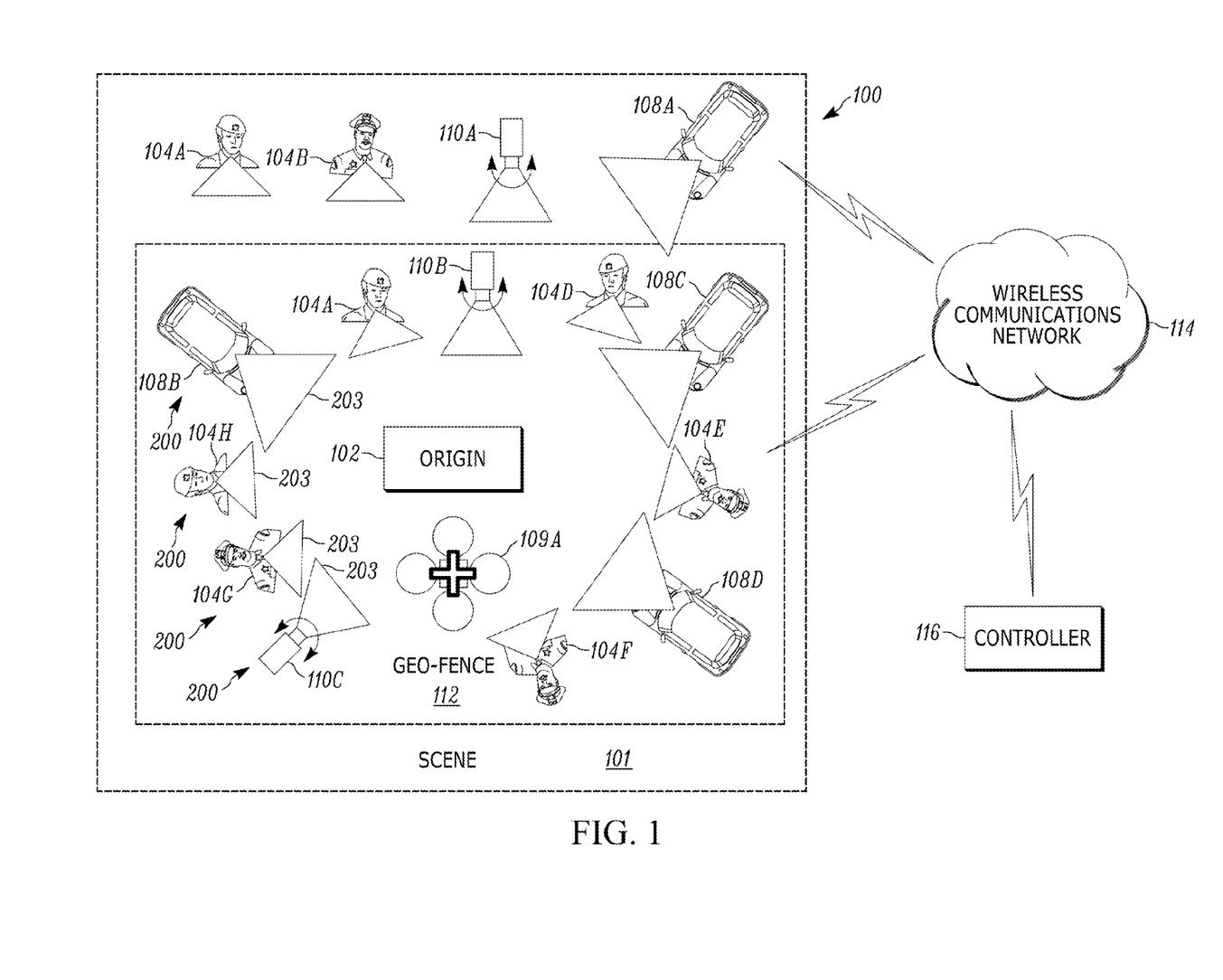
FIG. 1 illustrates a system for imaging a scene in accordance with some embodiments.

FIG. 1 illustrates a system 100 for imaging a scene 101 in accordance with some embodiments. As illustrated in FIG. 1, the scene 101 includes an origin 102. The origin 102 represents a focal point of the scene 101. For example, in some embodiments, the origin 102 may be an accident or other incident occurring at the scene 101. In some embodiments, the scene 101 may include a plurality of origins 102. Also, in some embodiments, the origin 102 of the scene 101 may change over time. For example, the scene 101 may have an initial origin 102 and a subsequent origin 102 as the incident changes position or size within the scene 101. Accordingly, as described herein, the origin 102 represents a position or area within the scene 101 acting as a common reference point for the scene 101.

As illustrated in FIG. 1, the system 100 includes one or more image source devices 200 and a controller 116. In some embodiments, the one or more image source devices 200 are each an image source device that provides an image to the controller 116. The one or more image source devices 200 may include one or more movable cameras, stationary cameras, or combinations thereof. It should be understood that the specific type, number, and configuration of image source devices 200 illustrated in FIG. 1 is provided merely as one example of the system 100. In other embodiments, the system 100 may include fewer or additional image source devices 200 in different combinations and configurations than illustrated in FIG. 1. Also, it should be understood that the image source devices 200 may include still cameras, video cameras, other sensors generating image data, or combinations thereof. In addition, it should be understood that the reference number 200 is used to generically refer to all types of image source devices and that only some of the image source devices illustrated in FIG. 1 are labeled with 200 for sake of brevity. Furthermore, as described below, reference numbers may also be provided in the description and the figures to indicate specific types of image source devices. Accordingly, a particular image source device illustrated in the figures may include two references numbers.

For example, as illustrated in FIG. 1, the system 100 may include one or more body cameras 104A through 104H (collectively body cameras 104), one or more dashboard cameras 108A through 108D (collectively dashboard cameras 108), one or more drone cameras 109A (collectively drone cameras 109), or combinations thereof, all of which are considered movable cameras. As described herein, a movable camera does not have a fixed position and may be configured to change its field-of-view (e.g., digitally or physically using one or more motors) to move in at least one direction (e.g., to perform one or more of pan-tilt-zoom (PTZ)). The body cameras 104 may be worn by paramedics, police officers, or other types of first responders or other individuals present at the scene 101. The dashboard cameras 108 may be supported by a vehicle (e.g., a police vehicle) located at the scene 101. The drone cameras 109 are attached to an unmanned aerial vehicle (UAV) or drone. In some embodiments, a movable camera may also include a mobile device with a camera, such as a smart telephone, tablet computer, handheld radio, a smart watch, and the like.

Similarly, as illustrated in FIG. 1, the system 100 may include one or more stationary cameras 110A through 110C (collectively stationary cameras 110), which may be mounted on buildings or other stationary structures. As described herein, a stationary camera has a fixed position but may be configured to change its field-of-view (e.g., digitally or physically using one or more motors) (e.g., to perform one or more of pan-tilt-zoom (PTZ)).

In some embodiments, each image source device 200 generates metadata and at least one image. The metadata may include, for example, an angle of the image source device 200, a bearing of the image source device 200 from the origin 102, a distance between the image source device 200 and the origin 102, a zoom setting of the image source device 200, a focal length of the image source device 200, a size of an imaging sensor included in the image source device 200, an aspect ratio of the image source device 200, a type of data compression (e.g., a type of video compression) performed by the image source device 200, a type of lens included in the image source device 200, or a location of the image source device 200. In some embodiments, a location of the image source device (i.e., location-based metadata) is derived from an accelerometer or a Global Position System (GPS) included in an image source device 200 (e.g., a movable camera). In other embodiments, location-based metadata is derived from predetermined location information associated with an image source device 200 (e.g., a stationary camera). For example, the location-based metadata for a stationary camera may be based on known location information associated with the stationary camera, which may be stored by the controller 116, transmitted by the image source device 200, or a combination thereof.

Figure 2:
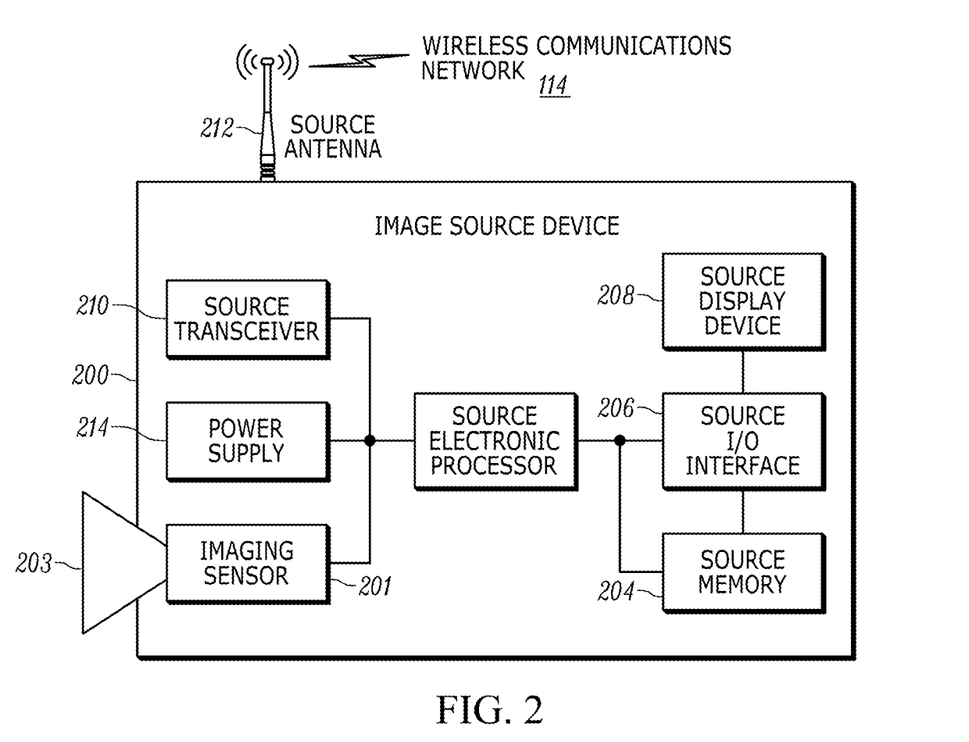
FIG. 2 is a block diagram of an image source device included in the system of FIG. 1 in accordance with some embodiments.

FIG. 2 is a block diagram of an image source device 200 included in the system of FIG. 1 in accordance with some embodiments. As illustrated in FIG. 2, an image source device 200 may include an imaging sensor 201 with a field-of-view 203 for generating an image, a source electronic processor 202, a source memory 204, and a source input/output (I/O) interface 206, a source transceiver 210, a source antenna 212, and a power supply 214. In some embodiments, the power supply 214 may be a battery, such as a rechargeable battery, or other suitable power source. In some embodiments, an image source device 200 also includes a source display device 208. The source electronic processor 202, the source memory 204, the source input/output interface 206, the optional source display device 208, and the source transceiver 210 communicate over one or more communication buses. It should be understood that the image source device 200 may include additional or different components than those components illustrated in FIG. 2 and may be configured to perform additional functionality than the functionality described herein. Also, it should be understood that although only a few field of views 203 are illustrated in FIG. 1 for sake of brevity, each image source device 200 illustrated in FIG. 1 includes at least one imaging sensor with a field of view 203.

The source memory 204 may include a program storage area (e.g., read only memory (ROM)) and a data storage area (e.g., random access memory (RAM), and other non-transitory, computer-readable medium). For example, the data storage area of the source memory 204 may store the individual metadata of the image source device 200 and the images generated by the imaging sensor 201.

The source electronic processor 202 is coupled to the source memory 204 and executes machine-readable instructions stored in the source memory 204. For example, instructions stored in the source memory 204, when executed by the source electronic processor 202, may cause the image source device 200 to communicate with the controller 116 via the source antenna 212 using one or more communication networks 114. As one example, the one or more communication networks 114 may include a wireless communications network that has long-range communication protocols, such as a cellular network (e.g., Long-Term Evolution (LTE)), a land mobile radio network, a local area network (e.g., wireless fidelity (Wi-Fi)), the Internet, or some other suitable long-range wireless communications network protocol. The one or more communications network 114 may also have one or more connections to a public switched telephone network (PSTN). Additionally or alternatively, in some embodiments, the one or more communication networks 114 include a wireless communications network that has short-range communication (e.g., Bluetooth™) protocols. Furthermore, in some embodiments, the one or more communication networks 114 include a wireless network having a combination of short-range and long-range communication protocols. Additionally or alternatively, in some embodiments, an image source device 200 may communicate with the controller 116 via the source antenna 212, a wired connection, or a combination thereof. For example, an image source device 200 that is a stationary camera may communicate with the controller 116 over a wired connection.

The source display device 208 outputs images generated by the imaging sensor 201. In some embodiments, as noted above, an image source device 200 does not include the source display device 208. Regardless of whether the image source device 200 includes the source display device 208, in some embodiments, a device with a display device external to the image source device 200, such as a smart telephone, a mobile radio, a tablet computer, a smart watch, and the like, receives one or more images generated by the imaging sensor 201 (e.g., through the one or more communication networks 114 or a direct connection) and outputs the image on the display device of the external device.

The source input/output interface 206 receives inputs, provides outputs, or a combination thereof. In some embodiments, the source input/output interface 206 receives input from a user through one or more input mechanisms, such as a touch screen, a button, a knob, and the like. For example, in some embodiments, the source input/output interface 206 includes a power button for turning the image source device on or off. Similarly, in some embodiments, the source input/output interface 206 provides output to a user through one or more output mechanisms. For example, in some embodiments, the source input/output interface 206 includes an indicator, such as a light-emitting diode, that indicates when imaging capability of the image source device 200 is activated. In some embodiments, the source input/output interface 206 may also receive a wired connection (e.g., a cable) that allows the image source device 200 to communicate with another device, such as a smart telephone, mobile radio, tablet computer, and the like (e.g., for displaying generated images, configuring the image source device 200, and the like).

Figure 3:
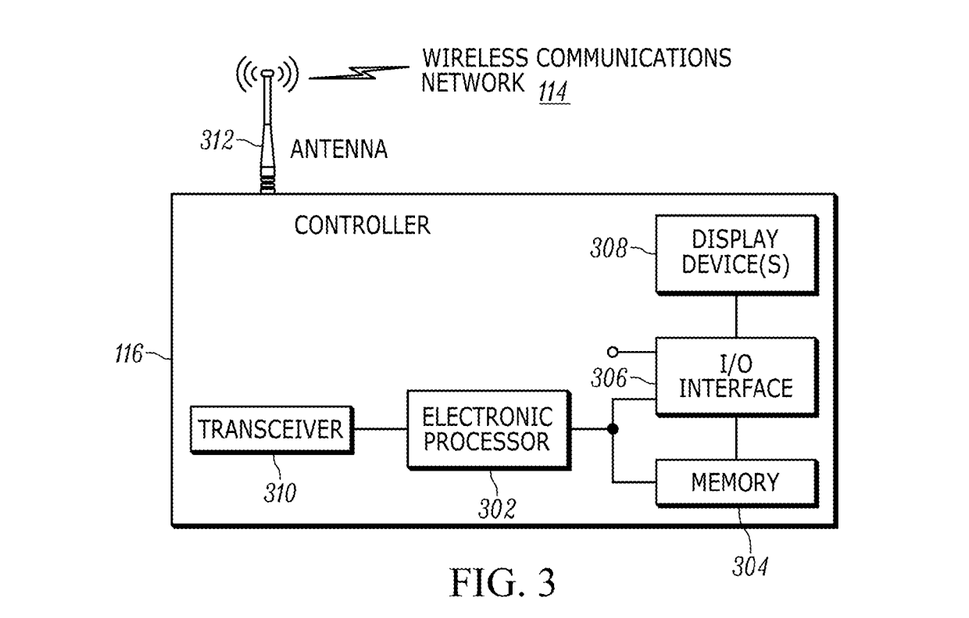
FIG. 3 is a block diagram of a controller included in the system of FIG. 1 in accordance with some embodiments.

FIG. 3 is a block diagram of the controller 116 according to one exemplary embodiment. In some embodiments, the controller 116 may be located within the scene 101. In other embodiments, the controller 116 may be located outside of the scene 101. The controller 116 may be part of a video management system. For example, the controller 116 may be located at a control center or a command center that uses a video management system to monitor the scene 101 (e.g., in real-time or historically). It should be understood that the specific type, number, and configuration of the controller 116 illustrated in FIG. 3 is provided merely as one example of the controller 116. In other embodiments, the controller 116 may include fewer or additional components in different combinations and configurations than illustrated in FIG. 3. It is also understood that the functionality of the controller 116 may be incorporated into one of the image source devices 200 or other suitable image source devices. Additionally, it is understood that the functionality of the controller 116 may be divided between the image source devices 200 or other suitable image source devices.

The controller 116 includes an electronic processor 302 (e.g., a microprocessor or another suitable processing device), a memory 304 (e.g., a non-transitory computer-readable storage medium), an input/output interface 306, an optional display device 308, a transceiver 310, and an antenna 312. It should be understood that the controller 116 may include additional or different components than those components illustrated in FIG. 3 and may be configured to perform additional functionality than the functionality described herein.

The electronic processor 302, the memory 304, the input/output interface 306, the display device 308, and the transceiver 310 are coupled by one or more control or data buses to enable communication between the various modules and components. The memory 304 may include a program storage area (e.g., read only memory (ROM)) and a data storage area (e.g., random access memory (RAM), and other non-transitory, machine-readable medium). For example, the data storage area of the memory 304 may store the individual metadata and images received from the plurality of image source devices 200.

The electronic processor 302 is coupled to the memory 304 and executes machine-readable instructions stored in the memory 304. For example, the electronic processor 302 may execute instructions stored in the memory 304 to perform the methods described in FIG. 4A through FIG. 7.

As noted above, the display device 308 may optionally be included in the controller 116. The display device 308 may output images received from image source devices, a combined image generated by the controller 116, or a combination thereof. In some embodiments, the display device 308 may also display a graphical user interface that allows a user to configure the controller 116 (e.g., define a canvas for a combined image of a scene). Regardless of whether the controller 116 includes the display device 308, in some embodiments, a device external to the controller 116 may communicate with the controller 116 (e.g., over the one or more communication networks 114 or a direct connection) and a display device included in the external device may provide the functions of the display device 308 described above. For example, in some embodiments, a computing device, such as a laptop computer or a desktop computer communicates with the controller 116 over the one or more communication networks 114 (e.g., through a browser application) to view images generated by the image source devices 200, view a combined image generated by the controller 116, configuration the controller 116, and the like.

The input/output interface 306 receives inputs, provides outputs, or a combination thereof. In some embodiments, the input/output interface 306 receives input from a user through one or more input mechanisms, such as a touch screen, a button, a knob, and the like. Similarly, in some embodiments, the input/output interface 306 provides output to a user through one or more output mechanisms. In some embodiments, the input/output interface 306 may also receive a wired connection (e.g., a cable) that allows the controller 116 to communicate with another device, such as a smart telephone, mobile radio, tablet computer, and the like (e.g., for outputting generated images, configuring the controller 116, and the like).

The electronic processor 302 wirelessly communicates with one or more image source devices 200 via the transceiver 310 and the antenna 312 using the one or more communication networks 114. As described above, the communication network 114 may include wired or wireless connections using different types of communication protocols. For example, in some embodiments, the electronic processor 302 receives data including metadata and at least one image from one or more image source devices 200 via the transceiver 310 and the antenna 312.

The electronic processor 302 may process images received from one or more image source devices 200 to generate a combined view as described in FIG. 4A through FIG. 7 below. The electronic processor 302 may control the input/output interface 306, the optional display device 308, or both to output the generated combined view of the scene 101.

In particular, as described above, the controller 116 receives metadata from one or image source devices 200. The controller 116 may use the received metadata to identify what image source devices 200 are associated with the scene 101. For example, as noted above, the metadata may include a location of an image source device 200. Accordingly, the controller 116 may identify one or more image source devices 200 associated with the scene 101 based on received metadata.

Alternatively or in addition, in some embodiments, a geo-fence 112 is associated with the scene 101 as illustrated in FIG. 1. The geo-fence 112 is a virtual perimeter for a real-world geographic area. In some embodiments, the controller 116 dynamically generates the geo-fence 112 around the origin 102 of the scene 101. In some embodiments, the controller 116 may use the geo-fence 112 to differentiate between image source devices 200. In particular, the controller 116 may identify image source devices 200 associated with the scene 101 by identifying whether an image source device 200 is located within or outside of the geo-fence 112. For example, as illustrated in FIG. 1, the controller 116 may determine that body cameras 104C through 104H, dashboard cameras 108B through 108D, drone camera 109A, and the stationary cameras 110B and 110C are located within the geo-fence 112. Therefore, the controller 116 may associate these image source devices 200 with the scene 101. It should be understood that the image source devices 200 associated with the scene 101 may dynamically change based on movement of the image source devices 200 or the size or shape of the geo-fence 112. That is, image source devices 200 may be part of a resource pool and can dynamically enter and exit the geo-fence 112. It is also understood that the data (e.g., image data and associated metadata) collected by the image source devices 200 in the resource pool that have exited the geo-fence 112 can still be utilized by the controller 116 as historical data. In other words, data collected by the image source devices 200 in the resource pool that are not within the geo-fence 112 may still be used as historical data that may be used to fill missing portions as described in greater detail below.

After identifying one or more image source devices 200 associated with the scene 101, the controller 116 may process one or more images from at least a subset of the associated image sources devices. For example, in some embodiments, the controller 116 may only receive images from a subset of the image source device 200 associated with the scene 101 (e.g., those image source devices 200 with active cameras). The controller 116 may identify the remaining image source devices 200 as available image source devices 200. An available image source device 200 may be associated with the scene 101 but may not be actively providing any images to the controller 116. As described in more detail below, the controller 116 may activate an available image source device 200 to receive additional or replacement images for the scene 101. It should be understood that in some embodiments, the controller 116 uses images from an image source device 200 to determine whether the image source device 200 is associated with the scene 101 (e.g., by performing image analytics to identify particular landmarks in the image). Similarly, it should be understood that in some embodiments, the controller 116 uses metadata from an image source device 200 to determine whether the image source device 200 is associated with the scene 101 (e.g., by calculating the field-of-view of the image source device 200).

The controller 116 processes images received from image source devices 200 associated with the scene 101 to generate a combined image of the scene 101. It should be understood that an image from an image source device 200 may include a static image or a video image feed. Accordingly, in some embodiments, the combined image generated by the controller 116 includes a still image or a video image feed. For example, FIGS. 4A, 4B, 4C, and 4D illustrate example images received by the controller 116 from a plurality of the image source devices 200, wherein each image is associated with the scene 101, or, in particular, the origin 102. Each of the four images 404, 406, 408, and 410 may have a different field-of-view. For example, for ease of understanding, the four images 404, 406, 408, and 410 are described as corresponding to images provided by the dashboard camera 108B, the body camera 104H, the body camera 104G, and the stationary camera 110C. However, it should be understood that the controller 116 may receive more or less than four images and the received images may correspond to other types of image source devices 200.

Figure 4A:
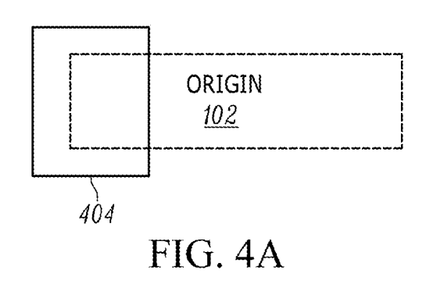
FIGS. 4A, 4B, 4C, and 4D illustrate example images received by the controller of FIG. 3 in accordance with some embodiments.
Figure 4B:
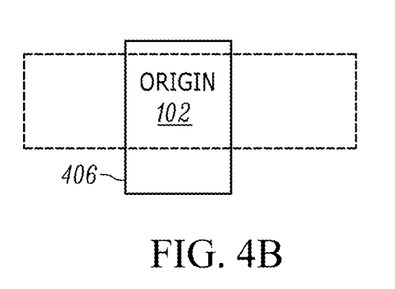
Figure 4C:
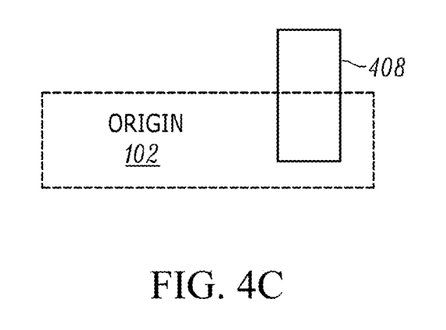
Figure 4D:
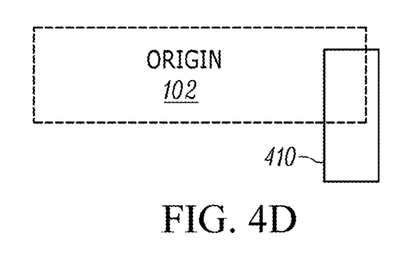
Figure 4E:
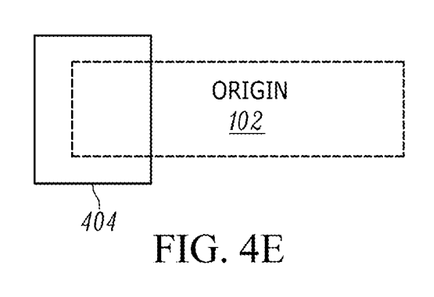
FIGS. 4E, 4F, 4G, and 4H illustrate the images of FIGS. 4A, 4B, 4C, and 4D modified by the controller of FIG. 3 in accordance with some embodiments.
Figure 4F:
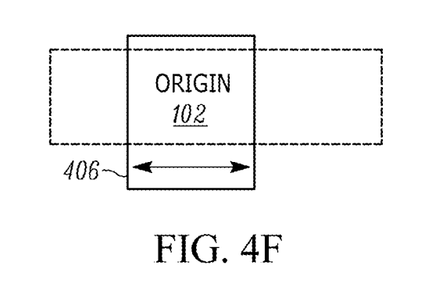
Figure 4G:
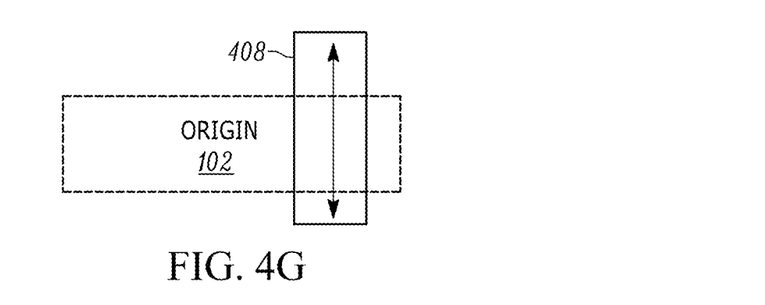
Figure 4H:
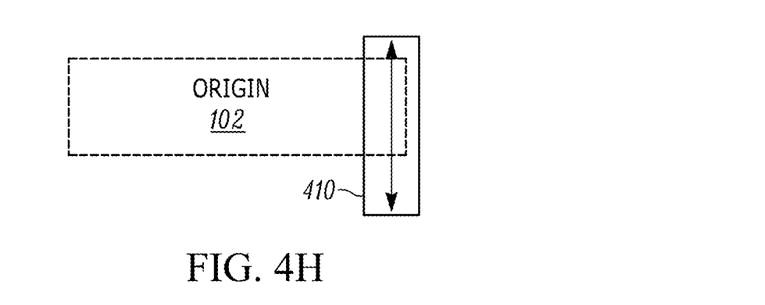
Figure 4I:
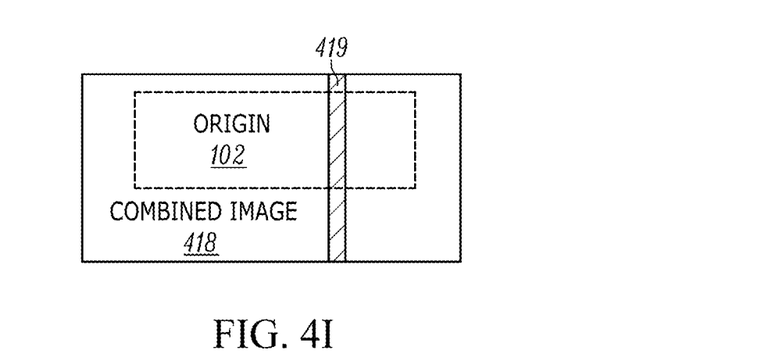
FIG. 4I illustrates a combined image generated by the controller of FIG. 3 based on the images of FIGS. 4A, 4B, 4C, and 4D in accordance with some embodiments.

The controller 116 (i.e., the electronic processor 302) uses the four images 404, 406, 408, and 410 and the associated metadata to identify overlapping portions of the images 404, 406, 408, and 410 and stitch the images 404, 406, 408, and 410 together to form a combined image 418 of the scene 101 (see FIG. 4I). In some embodiments, the combined image 418 includes an approximately 360 degree view of the scene 101. In other embodiments, the combined image 418 provides less than a 360 degree view of the scene 101. In these embodiments, the combined image 418 may provide a panoramic view of the scene. In yet other embodiments, the combined image 418 may provide a three-dimensional (3D) view of the scene. For example, the controller 116 may use distances and a direction angle associated with the images 404, 406, 408, and 410 to determine depth. The controller 116 may use the depth to generate the combined image 418 with a three-dimensional view of the scene.

For example, in some embodiments, the controller 116 or a separate device communicating with the controller 116 (e.g., the device including the display device 308) may generate and output a graphical user interface that receives input from a user specifying the size, shape, zoom, or a combination thereof of the combined image 418 to define a canvas. The canvas specifies a portion of an available view of the scene 101 based on the received images. In some embodiments, the graphical user interfaces receives a manual selection of a canvas from a user (e.g., a size and shape). In other embodiments, graphical user interfaces receives a manual selection of a region of interest (e.g., a house, a vehicle, an intersection, and the like), and the electronic processor 302 automatically sets an appropriate canvas based on the selected region of interest. In some embodiments, the graphical user interface also allows a user to specify a plurality of canvases, which may be displayed individually or as a merged canvas. In some embodiments, the canvas defines the origin 102 of the scene 101. Also, in some embodiments, the graphical user interface may receive user input for other aspects of the combined image 418, such as what image source devices 200 are associated with the scene 101, what images should be used to generate the canvas or the combined image 418, and the like.

In some embodiments, as part of generating the combined image 418, the controller 116 (i.e., the electronic processor 302) modifies one or more of the images 404, 406, 408, and 410 to improve the resulting combined image. For example, as different image source devices 200 may have different field-of-views, locations, zoom settings, aspect ratios, and the like, the images from these image source devices 200 may provide different points of view of the scene 101. Accordingly, the controller 116 may be configured to take into account direction (e.g., a direction vector) and position of an image source device 200 to dynamically modify (e.g., pan, tilt, zoom, and the like) the field-of-view of an image received from the image source device 200 (see FIGS. 4F, 4G, and 4H) so that the image may be combined with an image from another image source device 200. For example, in some embodiments, the controller 116 may combine distinct video modes (e.g., 16:9 aspect ratio versus 4:3 aspect ratio, short versus wide field-of-views, regular optics versus 180/360 degree optics, and the like) to digitally create the combined image 418 (or the canvas specified by the user).

Similarly, as the position, field-of-view, and other characteristics of image source devices 200 change (e.g., as a body camera or dashboard camera moves), the controller 116 may be configured to dynamically adjust the generation of the combined image 418. For example, each image received from an image source device 200 may be associated with a direction vector (e.g., measured from a baseline or center point of the canvas), which may change as the image source device 200 moves. The controller 116 uses this vector (along with other image characteristics, such as image source device location or distance from the origin 102, video modality (e.g., 16:9 aspect ratio, 180/360 degree optics, and the like), and other data to perform a digital pan-tilt-zoom (PTZ) of the image (e.g., a real-time digital pan, tilt, or zoom) to define a field-of-view (e.g., a best fit field-of-view) of the image that allows the controller 116 to stitch the image into the combined image 418 (e.g., provide patterns for performing pixel matching and point-of-view matching). In some embodiments, the controller 116 creates a table or list of received images (e.g., identified by direction, distance from origin 102, modality, and the like) and process the table of received images to select those images to include in the combined image 418. Again, the controller 116 may continuously recreate the combined image 418 to track the changes of the received images and changing characteristics of the image source devices 200 (e.g., changing positions). For example, as noted above, a user may manually modify a canvas associated with the combined image 418. Also, in some embodiments, the canvas is automatically modified (e.g., using contextual or situation triggers). It is also understood that the canvas can be modified continuously and in real-time or near real-time.

Accordingly, it may be difficult to use the received images to generate a combined image of the scene (e.g., a panoramic image). Similarly, the image source devices may not capture images of all portions of the scene. For example, as illustrated in FIG. 4I, the combined image 418 may include one or more missing portions 419, which provides a fragmented view of the scene and can impact how the incident is handled.

Figure 5:
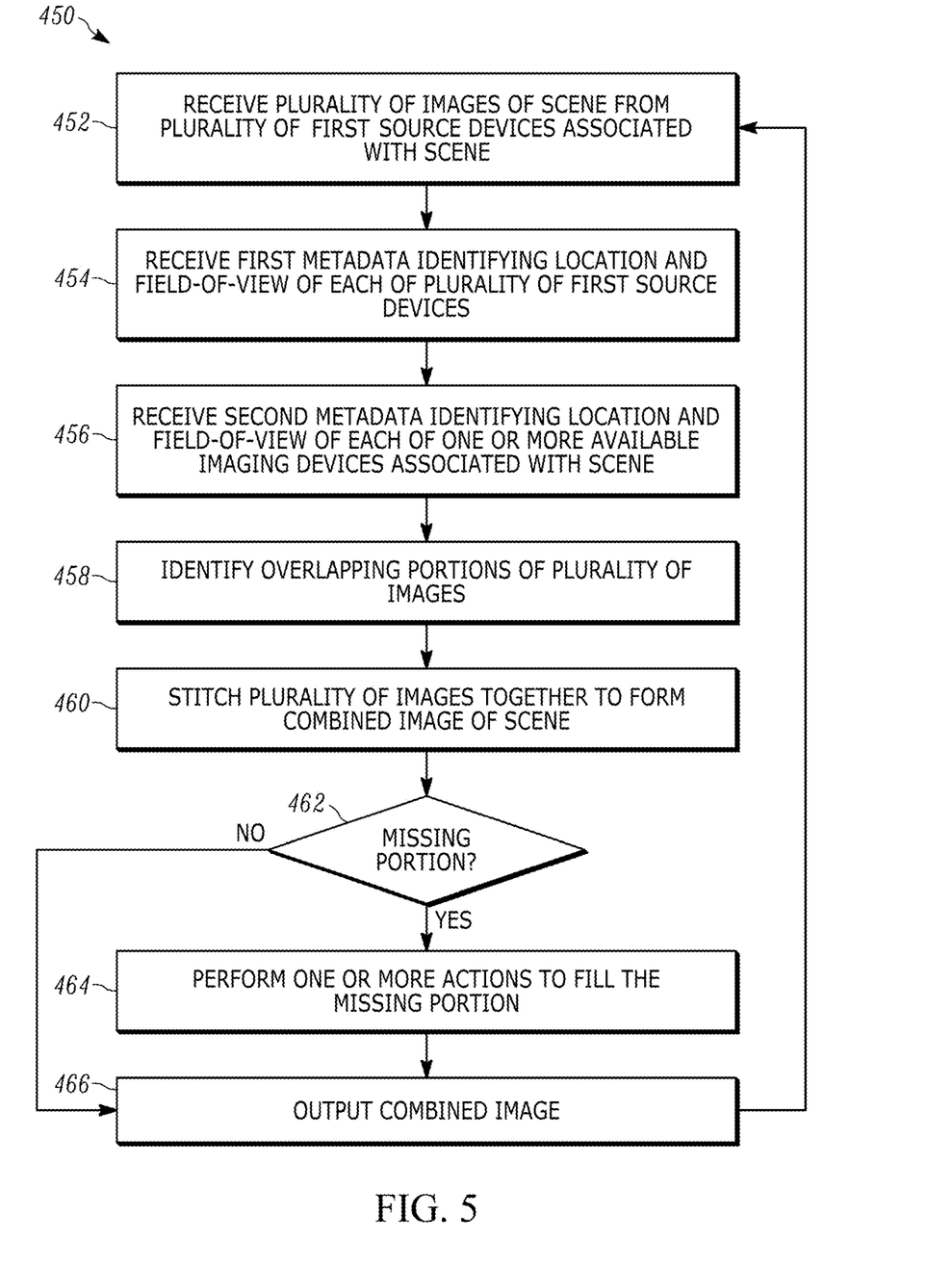
FIG. 5 is a flow chart illustrating a method of imaging a scene using the system of FIG. 1 in accordance with some embodiments.

Accordingly, the controller 116 (i.e., the electronic processor 302) is configured to identify one or more missing portions and perform one or more actions to fill the missing portions. For example, FIG. 5 is a flow chart illustrating a method 450 of imaging the scene 101 in accordance with some embodiments. As illustrated in FIG. 5, the electronic processor 302 of the controller 116 receives a plurality of images of the scene 101 from a plurality of first source devices (e.g., all or a subset of the plurality of image source devices 200) deployed at or associated with the scene 101 (at block 452). The electronic processor 302 also receives a first metadata that identifies a location and a field-of-view of each of the plurality of first source devices over time (at block 454). In addition, the electronic processor 302 receives a second metadata identifying a location and a field-of-view of each of one or more available imaging devices at or associated with the scene 101 (e.g., a subset of the plurality of image source devices 200 different than the plurality of first source devices) (at block 456). For example, as noted above, the electronic processor 302 may continuously, and in real-time or near real-time, process the first metadata to identify the plurality of first source devices. Similarly, the electronic processor 302 may continuously, and in real-time or near real-time, process the second metadata to identify the one or more available imaging devices.

The electronic processor 302 uses the first metadata to identify overlapping portions of the plurality of images (at block 458). In some embodiments, when the electronic processor 302 uses the first metadata to identify overlapping portions of the plurality of images, the electronic processor 302 identifies the location of each of the plurality of first source devices based on the bearing from the origin (e.g., the origin 102) and the distance from the origin of each of the plurality of first source devices. In some embodiments, when the electronic processor 302 uses the first metadata to identify overlapping portions of the plurality of images, the electronic processor 302 identifies the field-of-view of each of the plurality of first source devices based on the focal length and the size of the imaging sensor of each of the plurality of first source devices.

The electronic processor 302 uses the identified overlapping portions to stitch the plurality of images together to form a combined image of the scene 101 (at block 460). After generating the combined image, the electronic processor 302 identifies whether the combined image includes one or more missing portions (at block 462). When the electronic processor 302 identifies a missing portion ("YES" at block 462), the electronic processor 302 performs one or more actions to fill the missing portion (at block 464). After filling the missing portion, the electronic processor 302 outputs the combined image (e.g., to the display device 308 or other remote display device) (at block 466).

When the electronic processor 302 does not identify any missing portions in the combined image ("NO" at block 462), the electronic processor 302 outputs the combined image (e.g., to the display device 308 or other remote device) (at block 466). As illustrated in FIG. 5, the electronic processor 302 repeats (e.g., continuously) the method 450 to monitor and track the plurality of images from the image source devices 200 over time (e.g., even as image source devices 200 change location and/or field-of-view).

Figure 6:
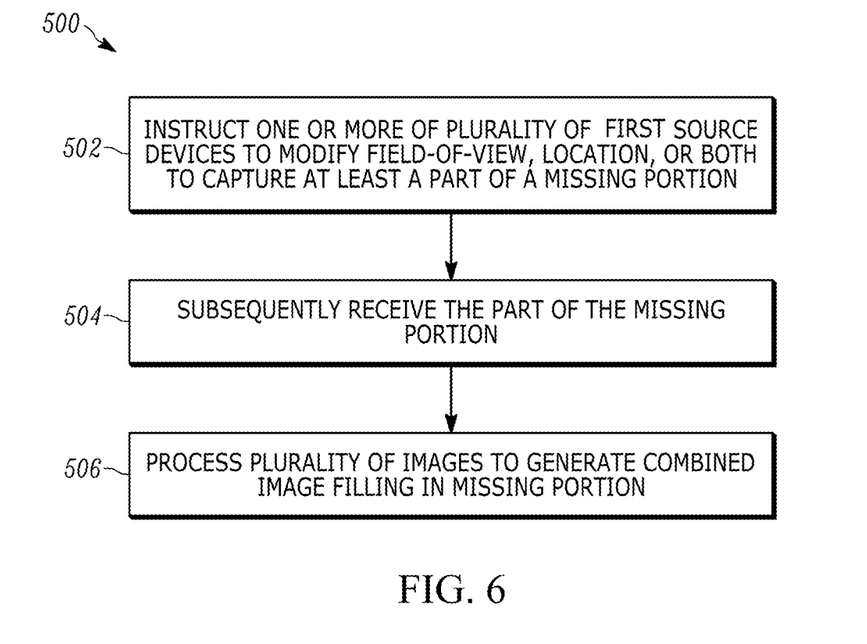
FIG. 6 is a flow chart illustrating a first method of performing an action to fill a missing portion of a combined image generated as part of the method of FIG. 5 in accordance with some embodiments.

FIG. 6 is a flow chart illustrating one method 500 of performing an action to fill an identified missing portion (at block 464 of FIG. 5) in accordance with some embodiments. As illustrated in FIG. 6, the electronic processor 302, in response to identifying a missing portion and as a function of the first metadata, instructs one or more of the plurality of first source devices to modify its field-of-view, its location, or both to capture at least a part of a missing portion (at block 502). In particular, the electronic processor 302 may identify whether a particular image source device 200 is located in a position where it could capture at least a part of the missing portion based on the first metadata. For example, the electronic processor 302 may instruct the stationary camera 110B to change its physical tilt, pan, or zoom setting to physically modify the field-of-view of the stationary camera 110B. In another example, the electronic processor 302 may instruct a body camera 104, a dashboard camera 108, a drone camera 109, and/or a stationary camera 110 to change its digital tilt, pan, or zoom setting to digitally modify its field-of-view. Similarly, the electronic processor 302 may instruct an individual wearing a body camera 104, a vehicle supporting a dashboard camera 108, or a drone supporting a drone camera 109 to change position at the scene 101.

After the electronic processor 302 instructs the one or more of the plurality of first source devices, the electronic processor 302 subsequently receives the part of the missing portion (at block 504). For example, when the electronic processor 302 receives images from the one or more image sources in response to the transmitted instructions, the received images include the missing portion. The electronic processor 302 processes the images as described above to generate the combined image to fill (e.g., to eliminate) the missing portion (or at least a part thereof) (at block 506). It should be understood that in some embodiments, the electronic processor 302 may output the original combined image where the electronic processor 302 identified a missing portion and use the updated images to generate a subsequent combined image. In other embodiments, the electronic processor 302 may hold the original combined image until the updated images are received and output the combined image only after any missing portions have been filled.

Figure 7:
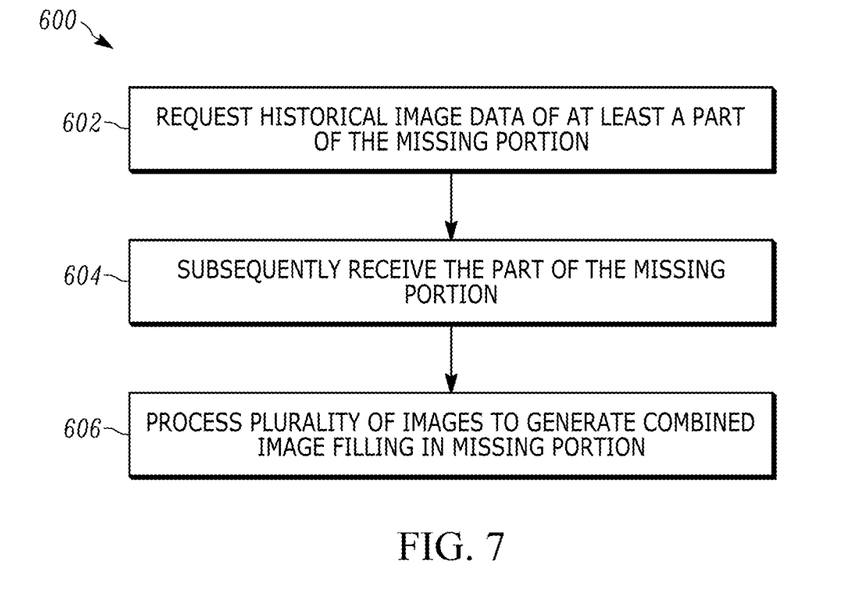
FIG. 7 is a flow chart illustrating a second method of performing an action to fill a missing portion of a combined image generated as part of the method of FIG. 5 in accordance with some embodiments.

FIG. 7 illustrates another method 600 of performing an action to fill an identified missing portion (at block 464 of FIG. 5) in accordance with some embodiments. The method 600 of performing an action to fill an identified missing portion as illustrated in FIG. 7 may be performed in addition to, as an alternative to, or in combination with the method 500 of FIG. 6. As illustrated in FIG. 7, the electronic processor 302, in response to identifying a missing portion and as a function of the first metadata, requests historical image data (e.g., previously captured by one of the plurality of first source devices) of at least a part of the missing portion (at block 602). The historical image data may be stored in the memory 304 of the controller 116, in a device external to the controller 116, or a combination thereof. For example, in some embodiments, the controller 116 stores images and corresponding metadata received from the plurality of first source devices to create a repository of historical data that may be used to fill missing portions.

After the electronic processor 302 requests the historical image data of at least the part of the missing portion, the electronic processor 302 subsequently receives the part of the missing portion (at block 604). For example, when the electronic processor 302 receives the requested historical image data, the electronic processor 302 receives the part of the missing portion. The electronic processor 302 processes the images as described above to generate the combined image to fill the missing portion (at least a part thereof) (at block 606). In particular, the electronic processor 302 may modify the historical image data as described above for live image data to fit the historical data to the combined image (e.g., dynamically change tilt, pan, or zoom). In this situation, the historical data provides a virtual patch for the combined image.

It should be understood that in some embodiments, the electronic processor 302 may output the original combined image where the electronic processor 302 identified a missing portion and use the requested historical image data to generate a subsequent combined image. In other embodiments, the electronic processor 302 may hold the original combined image until the requested historical data is received and output the combined image only after any missing portions have been filled. Also, in some embodiments, when historical image data is not available for all or a part of a missing portion, the electronic processor 302 may be configured to mark (e.g., highlight) a missing portion or connecting edges associated with a missing portion. In addition, in some embodiments, the electronic processor 302 may use contextual information contained in the combined image or any available historical data to fill a missing portion or a part thereof. For example, when there is snow on the ground in the combined image but no snow in the historical image data, the electronic processor 302 may modify the historical image data to show snow on the ground. Similarly, when no historical data is available for a missing portion that includes a portion of a vehicle or other object with a known shape, the electronic processor 302 may create virtual image data to fill this missing portion.

Figure 8:
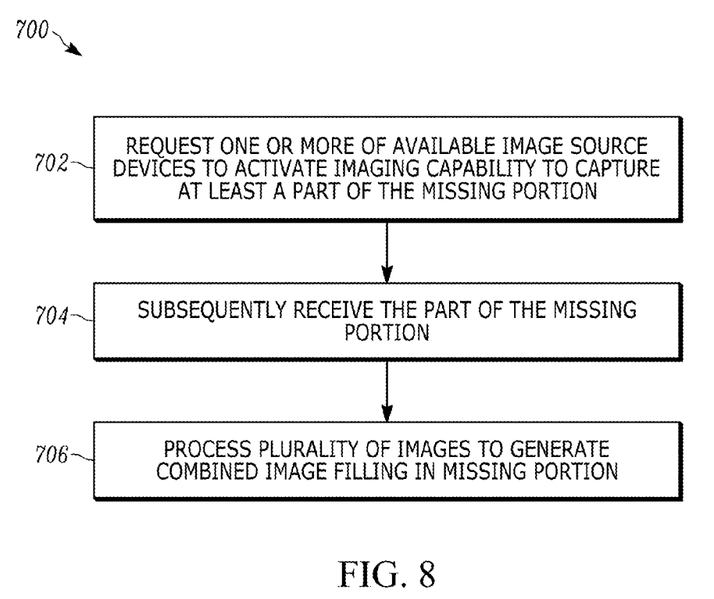
FIG. 8 is a flow chart illustrating a third method of performing an action to fill a missing portion of a combined image generated as part of the method of FIG. 5 in accordance with some embodiments.

FIG. 8 illustrates another method 700 of performing an action to fill an identified missing portion (at block 464 of FIG. 5) in accordance with some embodiments. The method 700 of performing an action to fill an identified missing portion as illustrated in FIG. 8 may be performed in addition to, as an alternative to, or in combination with, the methods 500 and 600 of FIGS. 6 and 7, respectively. As illustrated in FIG. 8, the electronic processor 302, in response to identifying a missing portion and as a function of the second metadata, requests one or more of the available image source devices to activate its imaging capability to capture at least a part of the missing portion (at block 702). The electronic processor 302 may select one or more of the available image source devices based on an image source device's position, field-of-view, ability to change its field-of-view or position, and the like, which is identified in the second metadata.

After the electronic processor 302 requests the one or more of the available imaging source devices to activate its imaging capability to capture at least the part of the missing portion, the electronic processor 302 subsequently receives the part of the missing portion (at block 704). For example, when the electronic processor 302 receives images from the activated available image source devices, the electronic processor 302 receives the part of the missing portion. The electronic processor 302 processes the images as described above to generate the combined image and fill the missing portion (or at least a part thereof) (at block 706). It should be understood that in some embodiments, the electronic processor 302 may output the original combined image where the electronic processor 302 identified a missing portion and use the images from the activated image source devices to generate a subsequent combined image. In other embodiments, the electronic processor 302 may hold the original combined image until images are received from the activated image source devices and output the combined image only after any missing portions have been filled.

It should be understood that the electronic processor 302 may be configured to perform one or more of the methods illustrated in FIGS. 5, 6, and 7 in any combination or order. Similarly, in some embodiments, the electronic processor 302 may take additional actions than those illustrated in FIGS. 5, 6, and 7. Also, in some embodiments, the actions performed by the electronic processor 302 may be based on user-configurations. For example, a user (e.g., through the display device 308) may specify what action or combination of actions is performed, an order of precedence of the actions, or a combination thereof. In other embodiments, the electronic processor 302 may determine what action or actions to perform based on the number of size of missing portions. Similarly, the electronic processor 302 may determine what action or actions to perform (or an order for performing actions) based on the current state of the system 100. For example, the electronic processor 302 may initially determine whether an activated image source device 200 could modify its location or field-of-view to capture a missing portion. When no such image source device 200 is available, the electronic processor 302 may activate an available image source device. When there is no available image source device, the electronic processor 302 may request historical image data. Similarly, in some embodiments, the electronic processor 302 may not request historical image data to fill a missing portion until sufficient historical image data is available.

For example, the electronic processor 302 may determine whether at least one of the plurality of first source devices has a modifiable field-of-view, a modifiable location, or both to capture at least the part of the missing portion. The electronic processor 302 may then perform one or more actions to fill the part of the missing portion. The one or more actions performed by the electronic processor 302 includes requesting the historical data of the part of the missing portion when none of the plurality of first source devices has the modifiable field-of-view, the modifiable location, or both to capture the part of the missing portion.

In another example, the electronic processor 302 may determine whether at least one of the plurality of first source devices has a modifiable field-of-view, a modifiable location, or both to capture the part of the missing portion. The electronic processor 302 may then perform one or more actions to fill the part of the missing portion. The one or more actions performed by the electronic processor 302 includes requesting one of the one or more available image source devices to activate imaging capability to capture the part of the missing portion when none of the plurality of first source devices has the modifiable field-of-view, the modifiable location, or both to capture the part of the missing portion.

In yet another example, the electronic processor 302 may determine whether at least one of the plurality of first source devices has a modifiable field-of-view, a modifiable location, or both to capture the part of the missing portion. The electronic processor may then determine whether the historical image data is available. The electronic processor 302 may then perform one or more actions to fill the part of the missing portion. The one or more actions taken by the electronic processor 302 includes requesting one of the one or more available imaging devices to activate imaging capability to capture the part of the missing portion when none of the plurality of first source devices has the modifiable field-of-view, the modifiable location, or both to capture the part of the missing portion and the historical image data is not available.

It should also be understood that the methods described in FIG. 5 through FIG. 7 may be used with live image feeds as well as historical images (e.g., to analyze the scene 101 after an incident has occurred). For example, the methods described in FIG. 5 through FIG. 7 may be used for both evidentiary purposes and investigative purposes.

Accordingly, the methods, apparatuses, and systems described herein image a scene (e.g., generating a combined image of the scene) based on images generated by one or more image source devices wherein missing portions of the resulting image of the scene are filled by performing one or more automatic actions, such as adjusting the position or field-of-view of an image source device, obtaining historical image data, activating imaging capability of an image source device, or a combination thereof. The resulting patched image of the scene may be output through a display device to provide a more complete view of the scene, which is especially useful for public safety situations, such as accidents and other incidents. Also, by allowing different configurations for imaging of the scene (e.g., what image source devices are used, what images are used, what is the size, shape, zoom, and focus of the resulting image, what actions are taken to fill missing portions, and the like), the methods, apparatuses, and systems described herein may be adapted to various situations. Furthermore, by continuously tracking images associated with a scene, the methods, apparatuses, and systems described herein maintain a fluid image of a scene even as image source devices change position, change field-of-views, and active and deactivate imaging capability, as the scene changes (e.g., location or size of the incident changes), or as image characteristics change (e.g., canvas changes).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for imaging a scene, the method comprising:
   receiving a plurality of images of a scene from a plurality of first source devices;
   receiving a first metadata identifying a location and a field-of-view of each of the plurality of first source devices;
   receiving a second metadata identifying a location and a field-of-view of each of one or more available image source devices associated with the scene;
   identifying overlapping portions of the plurality of images;
   stitching the plurality of images together to form a combined image of the scene based on the overlapping portions of the plurality of images;
   identifying a missing portion of the combined image of the scene; and
   responsive to identifying the missing portion, performing one or more actions to fill a part of the missing portion, wherein the one or more actions includes at least one selected from the group consisting of
   (i) instructing, as a function of the first metadata, one of the plurality of first source devices to modify a field-of-view, a location, or both to capture the part of the missing portion and subsequently receiving the part of the missing portion,
   (ii) requesting, as a function of the first metadata, historical image data of the part of the missing portion, and subsequently receiving the part of the missing portion, and (iii) requesting, as a function of the second metadata, one of the one or more available image source devices to activate imaging capability to capture the part of the missing portion, and subsequently receiving the part of the missing portion.

2. The method of claim 1, wherein performing the one or more actions to fill the part of the missing portion includes instructing the one of the plurality of first source devices to modify a field-of-view, a location, or both to capture the part of the missing portion.

3. The method of claim 1, wherein performing the one or more actions to fill the part of the missing portion includes requesting the historical image data of the part of the missing portion, and wherein the historical image data is data previously captured by at least one of the plurality of first source devices.

4. The method of claim 3, further comprising:
determining whether at least one of the plurality of first source devices has a modifiable field-of-view, a modifiable location, or both to capture at least the part of the missing portion, and
wherein performing the one or more actions to fill the part of the missing portion includes requesting the historical image data of the part of the missing portion when none of the plurality of images source devices has the modifiable field-of-view, the modifiable location, or both to capture the part of the missing portion.

5. The method of claim 1, wherein performing the one or more actions to fill the part of the missing portion includes requesting the one of the one or more available imaging devices to activate imaging capability to capture the part of the missing portion.

6. The method of claim 5, further comprising:
determining whether at least one of the plurality of first source devices has a modifiable field-of-view, a modifiable location, or both to capture the part of the missing portion, and
wherein performing the one or more actions to fill the part of the missing portion includes requesting the one of the one or more available image source devices to activate imaging capability to capture the part of the missing portion when none of the plurality of first source devices has the modifiable field-of-view, the modifiable location, or both to capture the part of the missing portion.

7. The method of claim 5, further comprising:
determining whether at least one of the plurality of first source devices has a modifiable field-of-view, a modifiable location, or both to capture the part of the missing portion,
determining whether the historical image data is available, and
wherein performing the one or more actions to fill the part of the missing portion includes requesting the one of the one or more available imaging devices to activate imaging capability to capture the part of the missing portion when none of the plurality of first source devices has the modifiable field-of-view, the modifiable location, or both to capture the part of the missing portion and the historical image data is not available.

8. The method of claim 1, wherein receiving the first metadata identifying the location and the field-of-view of each of the plurality of first source devices includes receiving data selected from a group consisting of an angle, a bearing from origin, a distance from the origin, a zoom, a focal length, a size of an imaging sensor, an aspect ratio, a type of video compression, and a type of lens.

9. The method of claim 8, wherein identifying the overlapping portions of the plurality of images includes identifying the location of each of the plurality of first source devices based on the bearing from the origin and the distance from the origin of each of the plurality of first source devices.

10. The method of claim 8, wherein identifying the overlapping portions of the plurality of images includes identifying the field-of-view of each of the plurality of first source devices based on the focal length and the size of the imaging sensor of each of the plurality of first source devices.

11. The method of claim 1, further comprising identifying the plurality of first source devices and the one or more available image source devices from a resource pool based on a geo-fence around an origin of the scene.

12. A controller comprising:
a memory; and
an electronic processor electrically coupled to the memory and configured to
receive a plurality of images of a scene from a plurality of first source devices;
receive a first metadata identifying a location and a field-of-view of each of the plurality of first source devices;
receive a second metadata identifying a location and a field-of-view of each of one or more available imaging devices associated with the scene;
identify overlapping portions of the plurality of images;
stitch the plurality of images together to form a combined image of the scene based on the overlapping portions of the plurality of images; and
identify a missing portion of the combined image of the scene; and
responsive to identifying the missing portion, perform one or more actions to fill a part of the missing portion, wherein the one or more actions includes at least one selected from the group consisting of
(i) instruct, as a function of the first metadata, one of the plurality of first source devices to modify a field-of-view, a location, or both to capture a part of the missing portion and subsequently receive the part of the missing portion,
(ii) request, as a function of the first metadata, historical image data of the part of the missing portion, and subsequently receive the part of the missing portion, and
(iii) request, as a function of the second metadata, one of the one or more available imaging devices to activate imaging capability to capture the part of the missing portion, and subsequently receive the part of the missing portion.

13. The controller of claim 12, wherein the electronic processor is configured to perform the one or more actions to fill the part of the missing portion includes the electronic processor configured to instruct the one of the plurality of first source devices to modify the field-of-view, the location, or both to capture the part of the missing portion.

14. The controller of claim 12, wherein the electronic processor is configured to perform the one or more actions to fill the part of the missing portion includes the electronic processor configured to request the historical image data of the part of the missing portion, and wherein the historical image data is data previously captured by at least one of the plurality of first source devices.

15. The controller of claim 14, wherein the electronic processor is further configured to:

determine whether at least one of the plurality of first source devices has a modifiable field-of-view, a modifiable location, or both to capture at least the part of the missing portion, and wherein the electronic processor is configured to perform the one or more actions to fill the part of the missing portion includes the electronic processor configured to request the historical image data of the part of the missing portion when none of the plurality of first source devices has the modifiable field-of-view, the modifiable location, or both to capture the part of the missing portion.

16. The controller of claim 12, wherein the electronic processor is configured to perform the one or more actions to fill the part of the missing portion includes the electronic processor configured to request the one of the one or more available imaging devices to activate imaging capability to capture the part of the missing portion.

17. The controller of claim 16, wherein the electronic processor is further configured to:

determine whether at least one of the plurality of first source devices has a modifiable field-of-view, a modifiable location, or both to capture the part of the missing portion, and wherein the electronic processor is configured to perform the one or more actions to fill the part of the missing portion includes the electronic processor configured to request the one of the one or more available imaging devices to activate imaging capability to capture the part of the missing portion when none of the plurality of first source devices has a modifiable field-of-view, a modifiable location, or both to capture the part of the missing portion.

18. The controller of claim 16, wherein the electronic processor is further configured to:

determine whether at least one of the plurality of first source devices has a modifiable field-of-view, a modifiable location, or both to capture the part of the missing portion, determine whether the historical image data is available, and wherein the electronic processor is configured to perform the one or more actions to fill the part of the missing portion includes request the one of the one or more available imaging devices to activate imaging capability to capture the part of the missing portion when none of the plurality of first source devices has the modifiable field-of-view, the modifiable location, or both to capture the part of the missing portion and the historical image data is not available.

19. The controller of claim 12, wherein the electronic processor is configured to receive the first metadata identifying the location and the field-of-view of each of the plurality of first source devices includes the electronic processor configured to receive data selected from a group consisting of an angle, a bearing from origin, a distance from the origin, a zoom, a focal length, a size of an imaging sensor, an aspect ratio, a type of video compression, and a type of lens.

20. The controller of claim 19, wherein the electronic processor is configured to identify the overlapping portions of the plurality of images includes the electronic processor configured to identify the location of each of the plurality of first source devices based on the bearing from the origin and the distance from the origin of each of the plurality of first source devices and identify the field-of-view of each of the plurality of first source devices based on the focal length and the size of the imaging sensor of each of the plurality of first source devices.

21. A non-transitory computer-readable medium comprising instructions that when executed are configured to cause an electronic processor to perform a set of functions comprising:

receiving a plurality of images of a scene from a plurality of first source devices;

receiving a first metadata identifying a location and a field-of-view of each of the plurality of first source devices;

receiving a second metadata identifying a location and a field-of-view of each of one or more available image source devices associated with the scene;

identifying overlapping portions of the plurality of images;

stitching the plurality of images together to form a combined image of the scene based on the overlapping portions of the plurality of images;

identifying a missing portion of the combined image of the scene; and responsive to identifying the missing portion, performing one or more actions to fill a part of the missing portion, wherein the one or more actions includes at least one selected from the group consisting of (i) instructing, as a function of the first metadata, one of the plurality of first source devices to modify a field-of-view, a location, or both to capture the part of the missing portion and subsequently receiving the part of the missing portion, (ii) requesting, as a function of the first metadata, historical image data of the part of the missing portion, and subsequently receiving the part of the missing portion, and (iii) requesting, as a function of the second metadata, one of the one or more available image source devices to activate imaging capability to capture the part of the missing portion, and subsequently receiving the part of the missing portion.

* * * * *